United States Patent [19]

Weasel, Jr.

[11] 4,454,723
[45] Jun. 19, 1984

[54] REFRIGERATED PRODUCE TRANSPORT

[76] Inventor: George E. Weasel, Jr., c/o NHY-TEMP, Inc., Hwy. 65, McClure, Ohio 43534

[21] Appl. No.: 477,728

[22] Filed: Mar. 21, 1983

Related U.S. Application Data

[63] Continuation-in-part of Ser. No. 305,952, Sep. 28, 1981, Pat. No. 4,406,131.

[51] Int. Cl.³ .............................................. F25D 17/02
[52] U.S. Cl. ..................................... 62/64; 62/78; 62/91; 62/239; 62/373; 426/524
[58] Field of Search ................ 62/64, 78, 91, 239, 62/373, 376; 426/524

[56] References Cited

U.S. PATENT DOCUMENTS

| | | | |
|---|---|---|---|
| 2,479,840 | 8/1949 | Johnson et al. | 62/239 |
| 2,751,882 | 6/1956 | Coyner | 62/64 |
| 3,153,917 | 10/1964 | Ellis | 62/373 |
| 3,239,360 | 3/1966 | Dixon | 62/51 |
| 3,269,133 | 8/1966 | Dixon | 62/51 |
| 3,365,307 | 1/1968 | Dixon | 62/51 |
| 3,385,073 | 5/1968 | Snelling | 62/239 |
| 3,421,336 | 1/1969 | Lichtenberger et al. | 62/239 |
| 3,487,769 | 1/1970 | Dixon | 62/51 |
| 3,525,235 | 8/1970 | Mauer | 62/373 |
| 3,563,757 | 2/1971 | Dixon | 62/239 |
| 3,672,182 | 6/1972 | Stowasser et al. | 62/70 |
| 3,961,925 | 6/1976 | Rhoad | 62/376 |
| 3,962,477 | 8/1976 | Dixon | 426/419 |
| 4,229,948 | 10/1980 | Waters | 62/64 |
| 4,307,580 | 12/1981 | Shaw | 62/375 |

*Primary Examiner*—Ronald C. Capossela
*Attorney, Agent, or Firm*—Wendell Coffee

[57] ABSTRACT

Fresh produce is loaded into an enclosed trailer, and the doors closed. Chilled water is pumped through overhead sprinkler pipes to chill the product to about 35 degrees Fahrenheit. Liquid nitrogen is used to maintain the trailer cold during transit and storage. Nitrogen tanks within the trailer are filled during the water chill operation. The nitrogen tanks are bled during the filling operation and the bled nitrogen extends through expansion tubes which are located co-axially within the water sprinkler tubes in the ceiling. From there the nitrogen is fed through exhaust pipes along the floor of the transport to purge the product of atmosphere and respiration gases. During transport, the liquid nitrogen is fed into the overhead expansion tubes for refrigeration and again the evaporated nitrogen is fed to the exhaust pipes along the floor to purge the product of respiration gases and to maintain the product oxygen-free.

7 Claims, 14 Drawing Figures

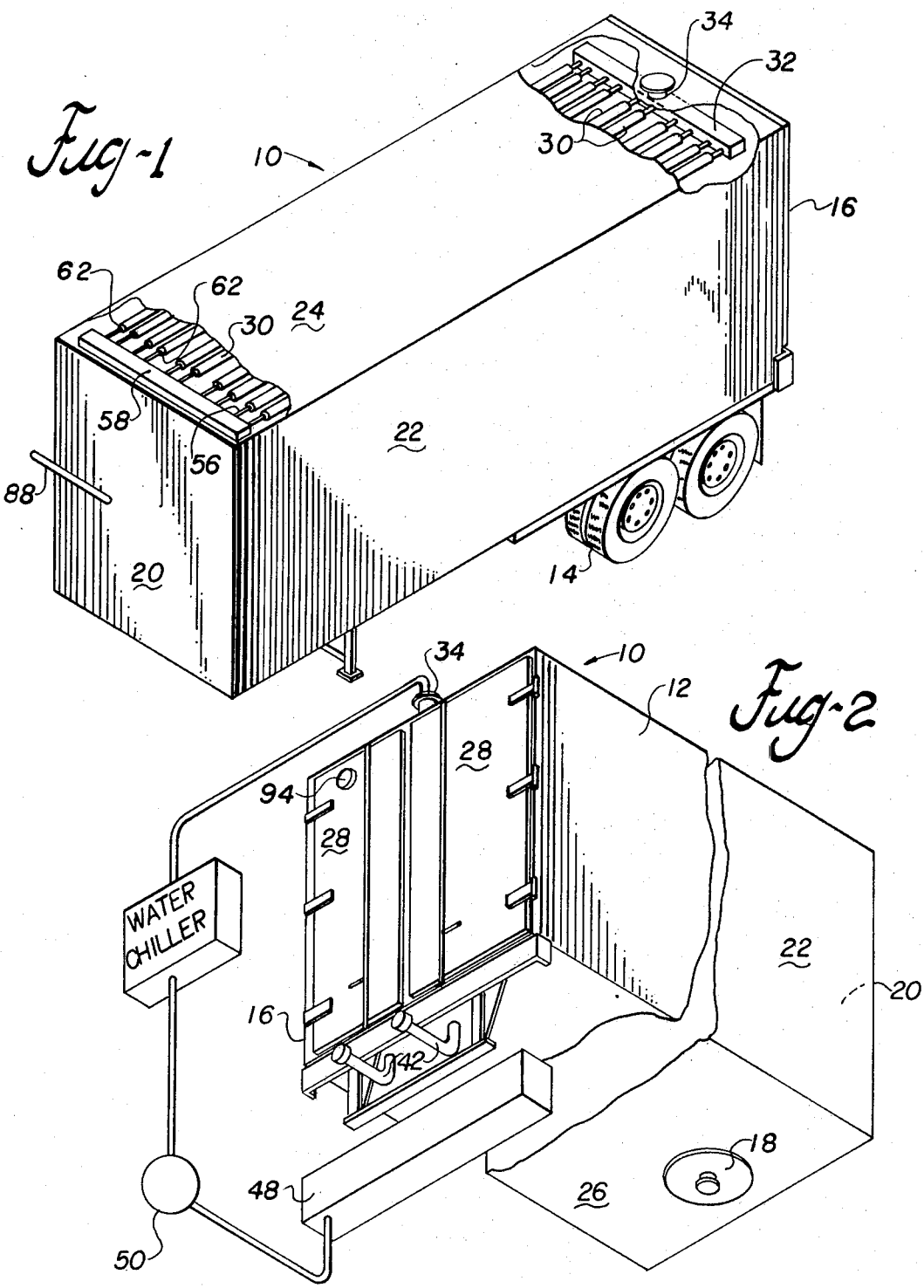

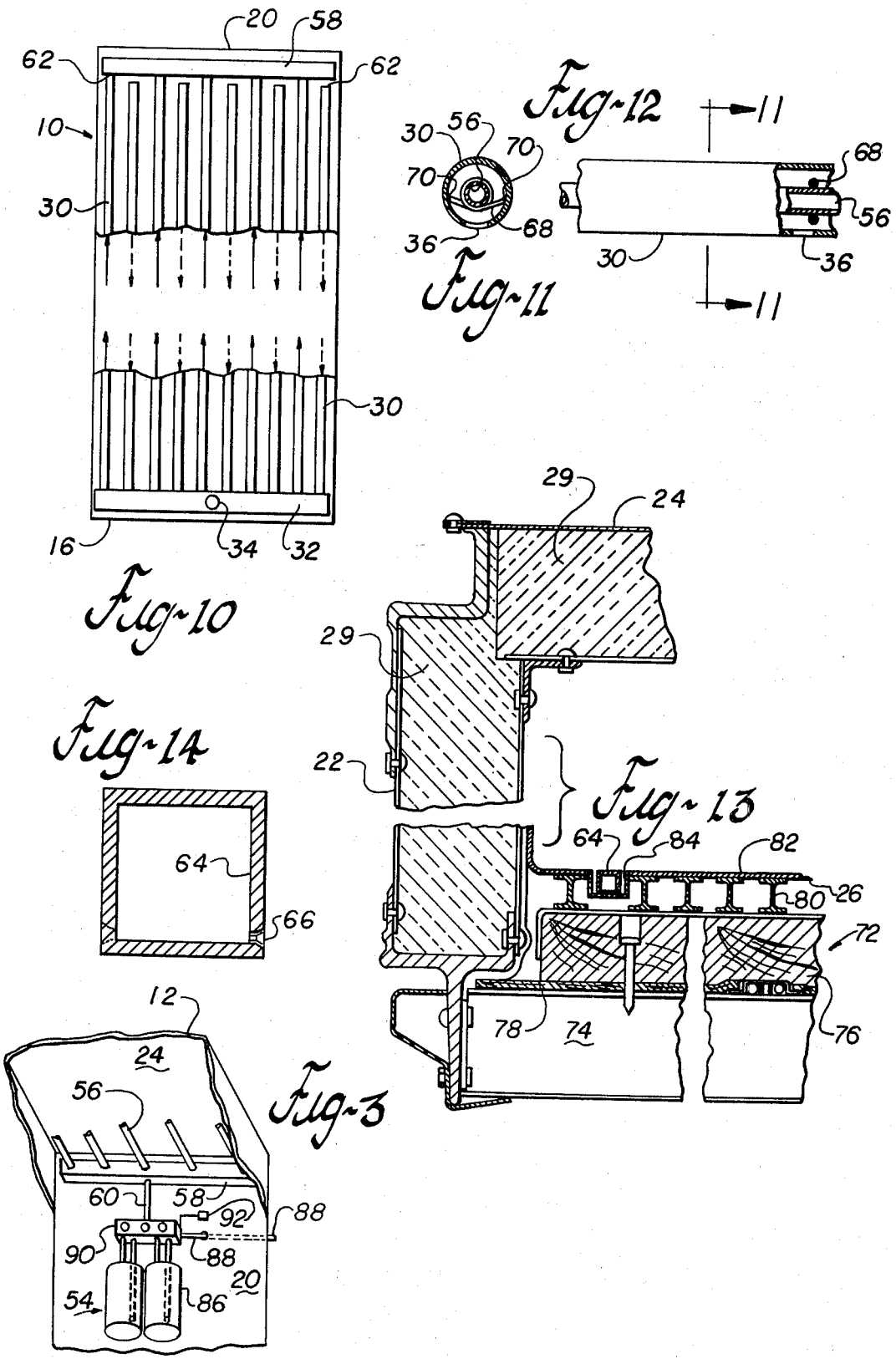

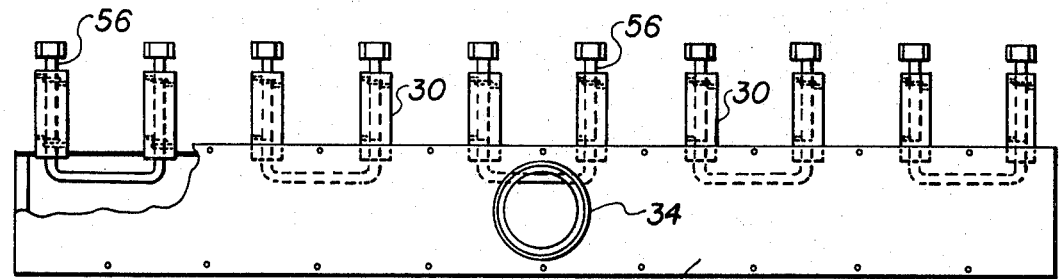
Fig-7
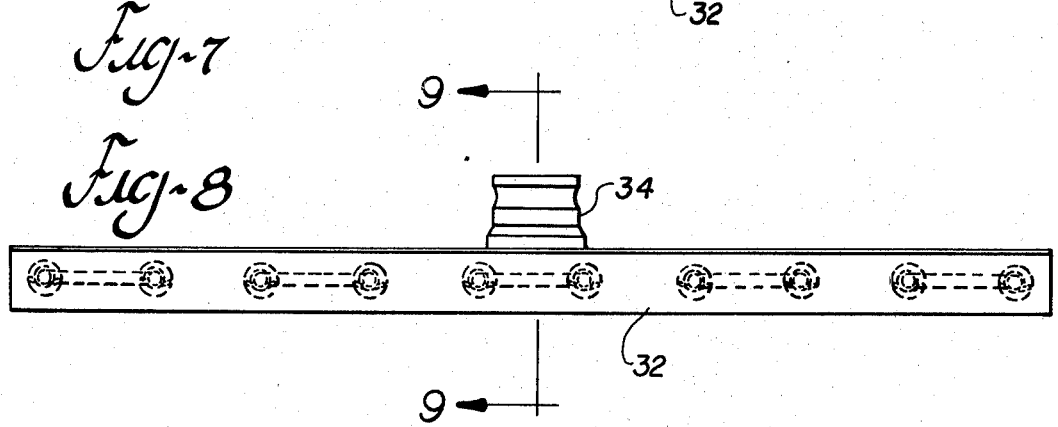
Fig-8
Fig-9
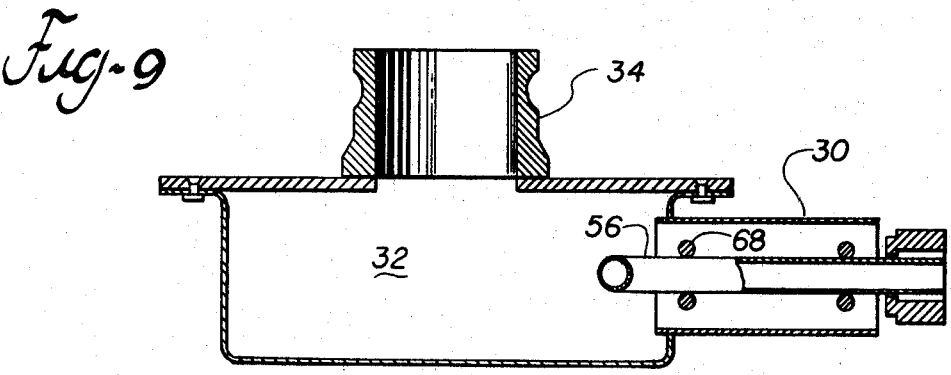
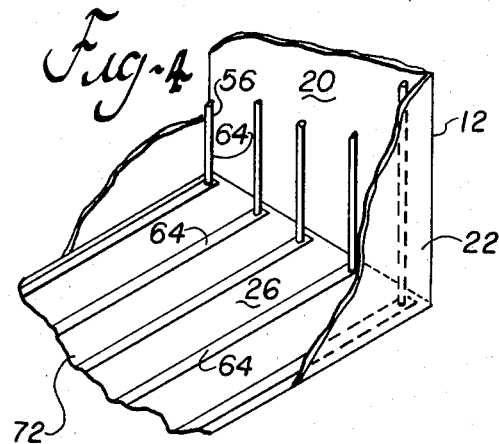
Fig-4

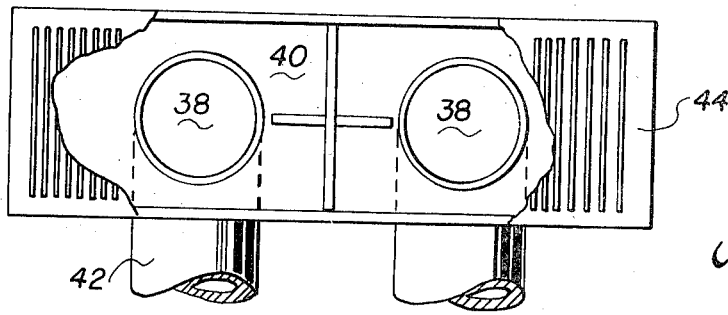
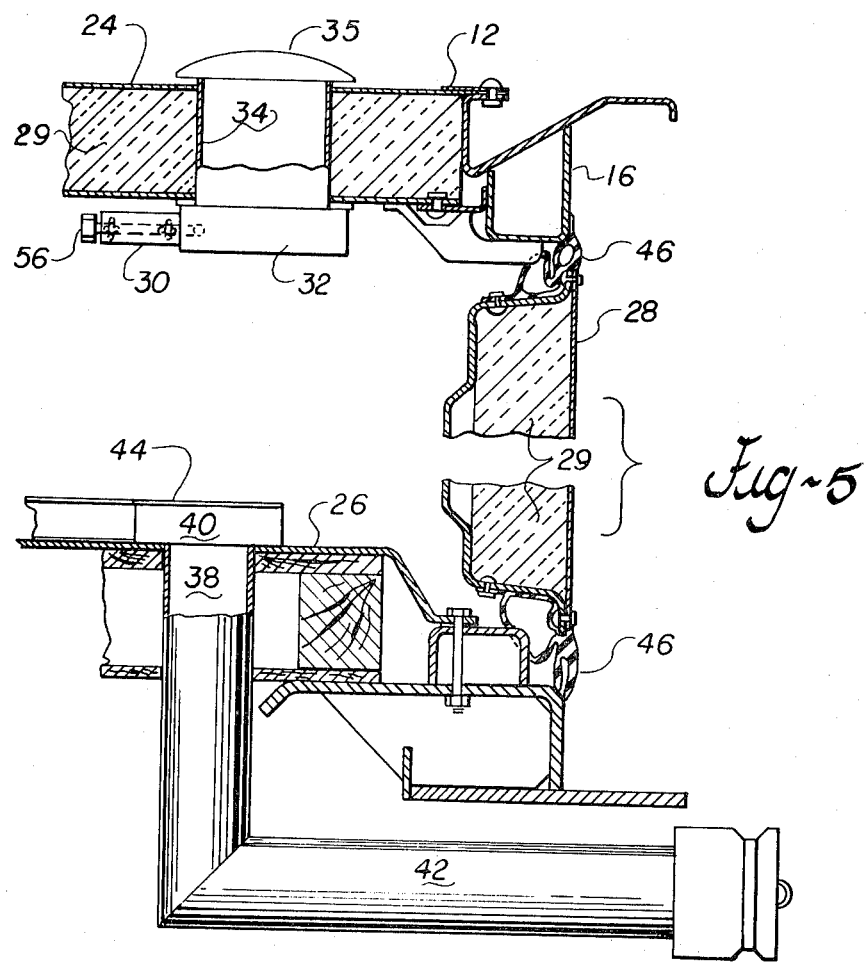

REFRIGERATED PRODUCE TRANSPORT

CROSS REFERENCE TO RELATED APPLICATIONS

This is a continuation in part of my prior application filed Sept. 28, 1981, Ser. No. 305,952, now U.S. Pat. No. 4,406,131.

BACKGROUND OF THE INVENTION (1) Field of the Invention

This invention relates to fresh produce and more particularly to the transportation of said produce.

(2) Description of the Prior Art

Before this invention, fresh harvested produce such as radishes had been loaded into trailers and chilled by a water flood. The water was flooded into the trailer by inserting water pipes into the open doors of the trailer and leaving the doors open for the water to drain from the trailer after it had flushed the product. After the product was chilled, the normal atmosphere was purged from the trailer and from the produce by flooding the area with nitrogen gas as produced by liquid nitrogen. Thereafter the trailer was closed as tightly as possible and sent to its destination. During this time, conventional refrigeration units were provided to keep the contents as near as possible to 32° Fahrenheit.

Before filing the parent application, a search was made in the United States Patent and Trademark Office and the following patents were found:

| JOHNSON ET AL | 2,479,840 |
| ELLIS | 3,153,917 |
| SNELLING | 3,385,073 |
| LICHTENBERGER ET AL | 3,421,336 |
| MAURER | 3,525,235 |

JOHNSON ET AL discloses cooling a refrigerated car by the expanding of liquid air. As described in column 5, line 11 of that patent, the liquid air might contain more oxygen than the atmosphere itself, or it might contain less oxygen.

ELLIS discloses discharging liquid nitrogen below floorboards within a compartment. Fresh food within the compartment would be chilled, but not frozen.

SNELLING discloses a refrigeration system for shipping perishable commodities having a heat exchanger (evaporator) at the top of the compartment. The gaseous nitrogen is discharged to the outside of the compartment. SNELLING also discloses pulling outside air from outside of the compartment or container to within the compartment or container. Column 7, line 4 indicates that the nitrogen may be discharged within the container.

LICHTENBERGER ET AL discloses coolant conduits extending under a covered floor or channels in the floor.

It does not appear to applicant that MAURER is as significant as the above described patents.

During the prosecution of the parent application, applicant became aware of the DIXON patents. They are as follows:

| DIXON | 3,239,360 |
| DIXON | 3,269,133 |
| DIXON | 3,365,307 |
| DIXON | 3,487,769 |
| DIXON | 3,563,757 |
| DIXON | 3,962,477 |

These patents show that it is desirable to reduce the amount of oxygen present in a closed container carrying fresh produce. The DIXON references teach that it is desirable not to reduce the oxygen below 5%. Specific examples in DIXON indicate that the oxygen in certain cases may be reduced to as low as ¼ of 1%.

The following additional patents are of record in the parent application.

| COYNER | 2,751,882 |
| STOWASSER ET AL | 3,672,182 |
| RHOAD | 3,961,925 |
| WATERS | 4,229,948 |
| SHAW | 4,307,580 |

However, applicant does not believe they are as pertinent as the patents specifically discussed above.

SUMMARY OF THE INVENTION (1) New and Different Function

I have invented a method for processing and transporting produce whereby the unusual and surprising results of maintained or enhanced freshness and flavor is achieved.

I use a special trailer which has permanently installed sprinkler pipes in the top thereof. Therefore, the doors are closed during the chilling process, greatly increasing the thermal efficiency of this process.

The produce is loaded into the trailer, or container, as soon as possible after harvest. Then the chilling process and the purging of all oxygen from the container occurs as soon as possible.

Nitrogen bottles carried on the trailer are filled during the chilling process. The exhaust nitrogen from the bottles is used in aiding the chilling of the water. This is accomplished by placing the nitrogen expansion tubes inside and co-axial with the sprinkler pipe. This location had another advantage, because in maintaining the low temperature during transportation, the evaporation of nitrogen within the pipes often forms super chilled ice around the pipes. If this super chilled ice falls upon the produce, it damages the produce upon which it falls. However, by having the expansion tubes within the water sprinkler pipes, it prevents the super chilled ice from falling upon the produce. After the nitrogen has been expanded, the exhaust nitrogen, both during the chilling period and during the transport period, is exhausted beneath the produce to purge the produce of atmosphere so that it is oxygen free and also to remove respiration gases generated by the produce.

Therefore, it may be seen that the total function of the combination of structure and steps of the method far exceeds the individual elements such as bottles, pipes, drains, etc.

(2) Objects of this Invention

An object of this invention is to process and transport fresh produce and other vegetation.

Further objects are to achieve the above with a method that is versatile, ecologically compatible, energy conserving, rapid, efficient, and inexpensive, and does not require skilled people to adjust, operate, and maintain.

The specific nature of the invention, as well as other objects, uses, and advantages thereof, will clearly appear from the following description and from the accompanying drawing, the different views of which are not scale drawings.

BRIEF DESCRIPTION OF THE DRAWING

FIG. 1 is a perspective view somewhat schematic with certain elements shown in phantom to show constructions and certain parts broken away for purposes of showing a trailer embodying this invention.

FIG. 2 is a partial perspective view showing a portion of the back bottom portion of the trailer with the associated equipment shown schematically.

FIG. 3 is a perspective view of the inside front top portion of the trailer showing equipment located in that area.

FIG. 4 is a perspective view of the inside front floor area showing equipment located in that area.

FIG. 5 is a sectional view of the rear door area showing both the water inlet and drain.

FIG. 6 is a top plan view of the water drain on the inside of the trailer.

FIG. 7 is a top plan view of the water header with parts broken away showing the U-bend of the expansion tubes.

FIG. 8 is a rear elevational view of the water header.

FIG. 9 is a sectional view of the water header, taken substantially on line 9—9 of FIG. 8 with parts broken away showing construction.

FIG. 10 is a top plan view of the water sprinkler pipes showing the flow of the nitrogen in the interior co-axial expansion tubes.

FIG. 11 is a sectional view taken substantially on line 11—11 of FIG. 12 showing the expansion tube within the water sprinkler pipe.

FIG. 12 is a fragmental view of the water sprinkler pipe broken away showing the expansion tube therein.

FIG. 13 is a sectional view of one side wall of the trailer showing a section of the floor and floorboard.

FIG. 14 is an enlarged cross-sectional view of one of the exhaust pipes.

DESCRIPTION OF THE PREFERRED EMBODIMENT

The refrigerator transport 10, according to my invention, is illustrated in the form of a trailer for highway use. The main portion of the transport is container or body 12. The body 12 itself might be a railroad car or it might be a compartment or container suitable for loading aboard a ship, rail car, or highway truck.

Describing the transport as a highway trailer, wheels 14 under the body 12 are adjacent to the rear 16 of the body. Fifth wheel 18 is connected near front wall 20 of the body 12. The fifth wheel is for attaching the refrigerated transport unit to a tractor. The fifth wheel 18 and the wheels 14 form a means for transporting the container or body 12 from one location to another in this embodiment. In other embodiments, the means for transporting would take other forms such as railway trucks or skids and lifting eyes.

The body 12 has side walls 22, top 24, and floor 26. Doors 28 over door openings will be at the rear of the body 12, which is opposite the front wall 20. The body, which is substantially air tight, will be insulated by insulation 29 in the walls, top, floor and doors of the body.

Water sprinkler conduits or pipes 30 are attached to the top 24 of the body therein. According to present design, a sprinkler unit of ten sprinkler pipes extend from the back to the front of the body. A water header 32 is located at the rear of the trailer within the body. Water inlet pipe 34 extends upward from the water header 32 through the insulated top 24 to cap connection 35 on top of the trailer. Each of the ten water pipes 30 fluidly and structurally connect to the water header 32. Sprinklers 36 are connected to the water pipes 30. When water is pumped into the inlet pipe 34 it flows through the water header 32 into the pipes 30 and out the sprinklers 36 which are sprinkler openings, flooding the body of the trailer with the water and particularly any produce which might be contained within the body 12.

Water drain means 38 is located in the floor 26 at the rear 16 of the trailer. The drain has a small catch basin 40 to catch and gather the water. According to present design, two outlet pipes 42 are connected to the water drain 38. The catch basin is covered by a suitable grille 44. It may be seen that when chilled water is pumped into the inlet pipe 34 and sprinkled through sprinkles 36 that the water, after flooding and chilling the produce within the body 12, will run to the basin 40 and be drained through the water outlet pipes 42. This is done with the doors 28 closed. The doors have seals 46 upon them to prevent thermal transfer around the doors. The chilling of the produce can be performed very economically with a minimum of thermal loss.

The water from the outlets 42 flows into a collection trough 48 outside of the body. The water is picked up by pumps 50 and pumped through water chiller 52 to be returned to the sprinkler pipes 30. Normally the produce will be chilled to a temperature which is above freezing. Normally the chilled water will be very close to freezing, to about 36° Fahrenheit. For efficient operation, the chilled water will not be higher than 37° Fahrenheit. For efficient operation, the volume of the water will not be less than 500 gallons per minute.

In certain cases the best available chilling water will be spring water or ground water from wells. In any event, the vegetation within the trailer is chilled as soon as possible with water of the lowest temperature available provided that the temperature of the water is never lower than what the vegetation will tolerate. Those having skill in transporting vegetation will recognize that each different produce (e.g. tomatoes, corn, mellons, lettuce, radishes) will be able to tolerate different temperatures. Seldom will any vegetation tolerate a temperature lower than 0° Centigrade (32° Fahrenheit). Some vegetation will not tolerate temperatures this low.

Bottle means 54 suitable for carrying liquid nitrogen is located within the container body 12 adjacent to the front wall 20 thereof. Nitrogen expansion tubes 56 are located co-axially within the water sprinkler pipes 30. According to present design, there are five expansion tubes. One end of each expansion tube 56 is connected to a nitrogen liquid header 58. The bottle means 54 is fluidly connected by connection 60 to the liquid header 58. Each of the expansion tubes 56 enters a terminal end 62 of one of the water pipes 30 adjacent to the liquid header 58. The terminal ends 62 of the water pipe are adjacent or near the front wall 20 of the body 12. The expansion tube extends through the water pipe to the water header 32. Each expansion tube 56 makes a U-turn within the water header 32 and runs back as a back run through an adjacent water pipe 30. The expansion tubes are within the sprinkler unit. After the back run of the expansion tube 56 extends through the terminal end 62 of the water pipe, and downward to one of five exhaust tubes or conduit or pipes 64. The exhaust pipes run along the floor 26 of the trailer. The exhaust pipes 64 run parallel to the water pipes, i.e. from the front to the back of the trailer. The exhaust pipes have exhaust openings or nozzles 66 therein.

The expansion tubes 56 are held co-axially within the water pipes by spring positioners 68. These spring positioners are made of round spring wire and they make about a 360° loop around the expansion tube 56 and have a terminal end 70 on each side of the expansion tube 56. The distance between the two terminals 70 is approximately the inside diameter of the water pipe 30. Therefore, the expansion tubes are held co-axially within the water pipe.

As illustrated the exhaust pipes 64 have rectangular cross-sections. They are located within the floorboards 72 of the trailer. Specifically illustrated referring to the floor and floorboard construction there may be seen main crossbeam 74 forming a substantial part of the structural elements of the body 12. Wooden cross spacers 76 are located above the crossbeams 74. Outer skin 78 of the body 12 is located between the crossbeam 74 and spacers 76 as is customary in refrigerated trailer construction. Longitudinal I-beams 80 are attached above the wooden spacers 76. The floorboard or plate 82 is above the longitudinal I-beams 80. At five regular intervals along the plate 82 there is a rectangular indentation or channel 84. The rectangular exhaust tubes or pipes 64 are located within the five rectangular indentations of channels. The nozzles 66 extend to one side of the exhaust pipe so that they are protected from being plugged by debris. It is emphasized that the longitudinal I-beam 80 and floor plates 82 as well as the crossbeam 74 and spacer 76 are designed for a general cargo carriage.

The nitrogen bottles 86 forming the bottle means 54 are permanently affixed within the container or body 12 to the front wall 20. According to current government regulations they are limited to twenty pounds pressure and are provided with an insulation jacket and evaporative vent and cooling means to maintain the nitrogen liquid at this low pressure. A filling line 88 extends from valve manifold 90 to outside the trailer through the insulation of either the front wall 20 or one of the side walls 22. Part of the connection 60 from the bottle means 54, extends to the manifold 90. Part of the filling operation is to vent the nitrogen bottles 86 during the filling process. This vented nitrogen is connected through the manifold 90 and connection 60 to the expansion tubes 56. According to present commercial practice, approximately one-third of the capacity of the nitrogen bottles 86 will be vented during the filling process. This will be chilled gas. The filling process is contemporaneous with the water chilling process. Since the expansion tubes 56 are co-axial with the water pipes 30, the water is further chilled by the vented gas from the filling procedures.

Temperature control means 92 is connected to the manifold 90. After the produce is chilled and during transport to a second location, the temperature within the body is maintained at the desired level which is as low as the vegetation will tolerate, by the temperature control means 92. This is performed by opening valves to connect liquid nitrogen into the expansion tubes 56.

The nitrogen will evaporate within the expansion tubes 56 chilling this area. After the nitrogen has expanded, it passes to the exhaust tubes or pipes 64 so that it exhausts beneath the produce to continue to purge respiration gas which may be formed by the produce and to maintain an oxygen free atmosphere.

Describing the operation, the doors 28 are opened and the produce, which is vegetation, for example radishes, is loaded within the body 12 of the trailer transport 10. Normally the produce is on pallets which are loaded by fork lifts. When the produce is loaded, the doors 28 are closed, and the seals 46 make the body 12 substantially air-tight. However, there are sufficient leaks or vents within the body to permit the escape of excess gas without forming undue high pressures within the body.

In addition to the leaks within the body to permit excessive gas from forming undue high pressures in the body, there is also pressure relief vent 94 which will vent or release gasses from within the body, but not permit the entry of the gasses from outside to within the body. It is important to prevent outside gasses from entering the body since the outside gasses are the normal ambient atmosphere which contains oxygen.

Thereafter, the trailer is positioned with the water drain 38 over or adjacent to the trough 48. Connections from water chiller 52 are made to the water inlet pipe 34 on top of the body 12. Then with the water chiller 52 operating, and the pump 50 operating, water is flushed over the radishes to chill them. Also liquid nitrogen from an external source is connected to the filling line 88. Through proper setting of manifold 90, the nitrogen bottles 86 are vented to the expansion tubes 56 and the nitrogen bottles 86 filled.

When the nitrogen bottles 86 are filled and when the produce (radishes) is chilled, the liquid nitrogen source is disconnected from the filling line 88 and the water chiller 52 disconnected from the water inlet pipe 34. The inlet pipe is capped to maintain the body 12 substantially air tight, and the water outlet 42 also is capped for the same reason.

Thereafter, liquid nitrogen from bottles 86 is released into the expansion tubes 56 where the liquid nitrogen vaporizes, chilling the tubes and through convection currents also keeping the body chilled also. The exhaust gas is exhausted through the exhaust nozzles 66 below the radishes to continue to remove expiration gas from them. The original atmosphere and the respiration gas present is removed from the radishes by the exhaust gas that is vented from the bottles 86 during the filling and chilling cycle so that the atmosphere in the container is oxygen free.

It is particularly important that the produce or vegetation be placed in the container at a first location and chilled as soon as commercially feasible. In certain situations, it will be commercially feasible to first chill the produce by using natural, available water. For example, in some cases there will be cold spring water, or cold ground water such as from wells which can be used to chill the vegetation. Then after an initial chilling, the produce can be transported to a more convenient location where colder water and a nitrogen supply is available. At that time, the chilling process can be completed and the removal of the oxygen containing atmosphere can be effected. The temperature of the water and the temperature to which the vegetation is chilled will be as low a temperature as is available but under no circumstances will it be a temperature lower than what the vegetation will tolerate. The removal of oxygen is desirable and the container be maintained free of oxygen. After the vegetation is thoroughly chilled or cooled by water, the doors are closed and the transporation process begun. The container is maintained at a low temperature by nitrogen evaporation only. I.e. the evaporation of the liquid nitrogen will hold the contents at a low temperature as well as continue to maintain the container oxygen-free. During this time any excessive gasses within the trailer will flow from the leaks around the body of the trailer which are maintained to as low a level as possible. Additionally, there is the valve 94 by which excessive gasses from within the body may be exhausted. During the transportation, the temperature in the container is maintained as low as vegetation will tolerate.

When the trailer with its load of produce reaches the second location, the doors 28 are opened, the liquid nitrogen turned off, so as to cease the chilling operation within the body 12. The produce is removed from the body. Thereafter the trailer 10 is used to backhaul any cargo available. The floorboards are made of sufficient structural strength to support general cargo and to withstand the rough handling to which they are subjected by the general cargo hauling.

At the time the trailer is returned to the point where the produce is to be loaded, the described process is repeated.

The embodiment shown and described above is only exemplary. I do not claim to have invented all the parts, elements or steps described. Various modifications can be made in the construction, material, arrangement, and operation, and still be within the scope of my invention.

The limits of the invention and the bounds of the patent protection are measured by and defined in the following claims. The restrictive description and drawing of the specific example above do not point out what an infringement of this patent would be, but are to enable the reader to make and use the invention.

As an aid to correlating the terms of the claims to the exemplary drawing, the following catalog of elements is provided:

| 10 | transport | 52 | water chiller |
|---|---|---|---|
| 12 | body | 54 | bottle means |
| 14 | wheels | 56 | expansion tubes |
| 16 | rear | 58 | nitrogen header |
| 18 | fifth wheel | 60 | connection |
| 20 | front wall | 62 | terminal ends |
| 22 | side walls | 64 | exhaust pipes |
| 24 | top | 66 | exhaust nozzles |
| 26 | floor | 68 | spring positioners |
| 28 | doors | 70 | spring terminal |
| 29 | insulation | 72 | floorboards |
| 30 | water pipes | 74 | crossbeam |
| 32 | water header | 76 | spacers |
| 34 | water inlet pipe | 78 | skin |
| 35 | cap connection | 80 | I-beams |
| 36 | sprinklers | 82 | floorboard or plate |
| 38 | water drain | 84 | channels |
| 40 | basin | 86 | nitrogen bottles |
| 42 | water outlet | 88 | filling line |
| 44 | grille | 90 | manifold |
| 46 | seals | 92 | temperature control |
| 48 | trough | 94 | valve |
| 50 | pump | | |

I claim as my invention:

1. The method of processing perishable vegetation comprising the steps of:
    a. placing the vegetation in a substantial air-tight container at a first location,
    b. flushing the vegetation as soon as possible after placing in the container with cold water at as low a temperature as the vegetation will tolerate, while simultaneously
    c. replacing the air in the container with an oxygen free atmosphere, then
    d. transporting the container to a second location, and
    e. during transportation
        i. maintaining the atmosphere in the container oxygen free, and
        ii. maintaining the temperature in the container as low as the vegetation will tolerate.

2. The invention as defined in claim 1 including all of the limitations a. through e. with the addition of the following limitation:
    f. using nitrogen as the oxygen free atmosphere to replace the air and as the transportation refrigerant.

3. The invention as defined in claim 1 including all of the limitations a. through e. with the addition of the following limitation:
    f. cooling the vegetation to a temperature of about 0° Centigrade by using cold flush water of a temperature of about 0° Centigrade.

4. The invention as defined in claim 1 including all of the limitations a. through e. with the addition of the following limitations:
    f. said vegetation being harvested produce which is
    g. placed in the air-tight container as soon as possible after harvest.

5. The method of processing perishable vegetation comprising the steps of:
    a. placing the vegetation in a substantial air-tight container at a first location,
    b. flushing the vegetation as soon as possible after placing in the container with cold water at as low a temperature as is available but no lower than the vegetation will tolerate, while simultaneously
    c. replacing the air in the container with an oxygen free atmosphere, then
    d. transporting the container to a second location, and
    e. during transportation
        i. maintaining the atmosphere in the container oxygen free, and
        ii. maintaining the temperature in the container as low as the vegetation will tolerate.

6. The method of processing and transporting perishable vegetation comprising:
    a. cooling the vegetation to as low a temperature as the vegetation will tolerate by
    b. flushing with chilled water
    c. in an oxygen free atmosphere of nitrogen, and
    d. maintaining the vegetation at as low a temperature as the vegetation will tolerate in the oxygen free nitrogen atmosphere during transportation.

7. The invention as defined in claim 6 including all of the limitations a. through d. with the addition of the following limitation:
    e. said vegetation is harvested produce and the cooling is as soon as commercially feasible.

* * * * *